A. E. WHITTIER.
OVEN THERMOMETER.
APPLICATION FILED JULY 15, 1914.

1,143,925.

Patented June 22, 1915.

UNITED STATES PATENT OFFICE.

ALBERT E. WHITTIER, OF BRISTOL, CONNECTICUT.

OVEN-THERMOMETER.

1,143,925. Specification of Letters Patent. Patented June 22, 1915.

Application filed July 15, 1914. Serial No. 851,093.

*To all whom it may concern:*

Be it known that I, ALBERT E. WHITTIER, a citizen of the United States, residing at Bristol, in the county of Hartford and State of Connecticut, have invented a new and useful Improvement in Oven-Thermometers, of which the following is a specification.

This invention relates to those devices which are designed to be located in openings in the walls of ovens of wood, coal, gas, oil and electric stoves and ranges for the purpose of indicating on the exterior the temperature in the interior of the oven in order that baking, roasting and other cooking may be done with certainty and exactness and a consequent saving of time and fuel and the production of more uniformly palatable food.

The object of the invention is to provide a thermometer for such purpose which has very few, easily formed and quickly assembled parts, and which is quite sensitive and accurate whereby an efficient article of this class may be furnished at a low cost.

Figure 1:
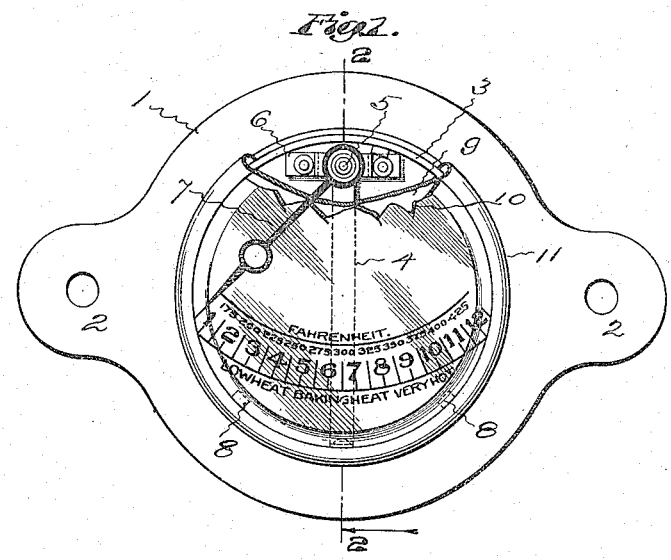
Figure 2:
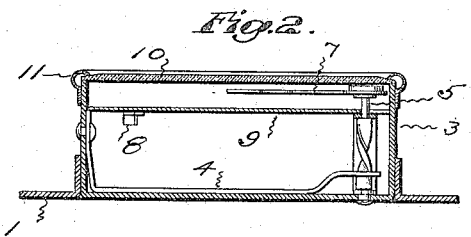
Figure 3:
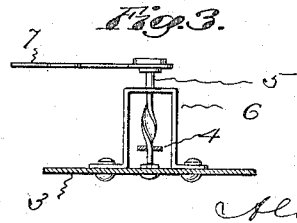

Figure 1 of the accompanying drawings shows a front view, with a part of the glass cover and the dial broken away, of a thermometer which embodies this invention. Fig. 2 shows a vertical section of the thermometer on the plane indicated by dotted line 2—2 on Fig. 1. Fig. 3 shows a side elevation of the spindle and pointer and the spindle support.

The back plate 1 is punched from thin sheet metal with a perforated ear 2 on each side for the passage of the bolts or screws by means of which the article is secured in place in the wall of an oven. In an opening through the center of the back plate that is illustrated, and extending forward, is a cup 3 which contains the active mechanism and dial. The thermo-metric arm 4 is made of a strip of the so called "thermostatic" metal of commerce, or of any two metals such as copper, nickel and steel having different co-efficients of expansion. This arm is fastened at one end to a wall of the cup or casing and it extends across the cup, desirably lying flat against the inside of the bottom of the cup. The free end of the thermo-metric arm shown is forked and the forked end embraces a spirally grooved portion of the spindle 5. This spindle has one end mounted in a bearing in the bottom of the cup and the other end extends through a bearing in a bridge piece 6 that is fastened to the bottom of the cup. On the outer end of the spindle is the pointer 7. Back of the pointer, and desirably supported by lugs 8 that are forced in from the sides of the cup, is the dial 9 on which are the scale and other indications with which the pointer coöperates to designate the temperature in the oven with which the device is used.

A cover 10 of glass or other transparent material is placed over the top of the cup and this may be held in place by a rim 11 of thin sheet metal.

The thermo-metric arm lying against or closely adjacent to the back wall of the cup becomes heated very quickly by conduction of heat from the oven through the bottom wall of the cup and consequently it acts quickly and is very sensitive. This arm is simple to form; it is easy to fasten in place; and it retains its shape while being very active and efficient. The spiral spindle is cheap and easy to form, and the connection between the end of the thermo-metric arm and the spiral section of the spindle is simple and durable and can be made so exact that the pointer will indicate on the dial the oven temperature with practical accuracy. The spiral is made on the spindle only such a distance that the pointer will be carried from one end of the dial scale to the other and if the thermo-metric arm tends to expand any farther its end will travel up on a straight portion of the spindle and thus not tend to further turn the spindle or strain any of the parts.

The invention claimed is:

1. An oven thermometer having a casing, an arm of thermo-metric metal with one end fastened to a wall of the casing, said arm for a substantial portion of its length lying against the back wall of the casing, a spindle with a spiral portion engaged by the free end of said arm, a pointer on the spindle, and a dial provided with a scale with which the pointer coöperates to indicate temperature.

2. An oven thermometer having a casing, a thermo-metric arm having one end fastened to the casing and its other end forked, a spindle with a spiral portion embraced by the forked end of the arm, a bridge piece secured to a wall of the casing and supporting the spindle, a pointer on the spindle, and a dial bearing a scale with which the pointer coöperates to indicate temperature.

3. An oven thermometer having a back plate, a receptacle secured to the back plate, a thermo-metric arm with one end fastened to a wall of the receptacle, said arm lying for a substantial portion of its length against the back wall of the receptacle, a spindle with a spiral portion engaged by the free end of said arm, means for supporting the spindle a dial held in the receptacle, and a pointer carried by the spindle outside of and registering with the dial.

ALBERT E. WHITTIER.

Witnesses:
GEO. W. PRIEST,
HORACE R. WHITTIER.

Copies of this patent may be obtained for five cents each, by addressing the "Commissioner of Patents, Washington, D. C."